United States Patent
Miyazaki et al.

[11] Patent Number: 5,549,979
[45] Date of Patent: Aug. 27, 1996

[54] MAGNETIC RECORDING MEDIUM

[75] Inventors: Shinji Miyazaki; Mitsuru Takai; Koji Kobayashi, all of Tokyo, Japan

[73] Assignee: TDK Corporation, Tokyo, Japan

[21] Appl. No.: 159,422

[22] Filed: Nov. 29, 1993

[30] Foreign Application Priority Data

Mar. 12, 1992 [JP] Japan ..................... 4-350045
Nov. 9, 1993 [JP] Japan ..................... 5-302215

[51] Int. Cl.⁶ ..................... G11B 5/66
[52] U.S. Cl. ..................... 428/694 T; 428/408; 428/432; 428/678; 428/694 TS; 428/694 TP; 428/694 TC; 428/694 TF; 428/694 TM; 428/695; 428/900
[58] Field of Search ..................... 428/694 T, 694 TS, 428/694 TP, 694 TC, 694 TF, 694 TM, 900, 678, 695, 432, 408

[56] References Cited

U.S. PATENT DOCUMENTS

| | | | |
|---|---|---|---|
| 4,775,576 | 10/1988 | Bouchoud | 428/216 |
| 5,055,358 | 10/1991 | Tsuno | 428/448 |
| 5,110,676 | 5/1992 | Murai et al. | 428/336 |
| 5,144,134 | 9/1992 | Onodera et al. | 250/307 |
| 5,344,706 | 9/1994 | Lambeth | 428/330 |

FOREIGN PATENT DOCUMENTS

| | | |
|---|---|---|
| 2-132623 | 5/1990 | Japan . |
| 3-21966 | 3/1991 | Japan . |
| 3-224132 | 10/1991 | Japan . |

*Primary Examiner*—Leszek Kiliman
*Attorney, Agent, or Firm*—Wood, Phillips, VanSanten, Clark & Mortimer

[57] ABSTRACT

A magnetic recording medium comprising a nonmagnetic base, an $SiO_x$ ($x=1.2-1.95$) undercoat, an under-layer ferromagnetic metal film consisting of a Co—Ni alloy, an $SiO_x$ ($x=1.2-1.95$) intermediate layer, an upper-layer ferromagnetic metal protective film consisting of a Co—Ni alloy, a diamond-like carbon protective film, and a lubricant layer, formed in the order of mention, the angles of vapor deposition as measured from lines normal to the upper- and under-layer ferromagnetic metal films being all decreasing toward the upper surfaces. The magnetic recording medium is made by forming an $SiO_x$ ($x=1.2-1.95$) undercoat by vapor deposition on a flexible nonmagnetic base being fed, forming an under-layer ferromagnetic metal film by vapor deposition of a Co—Ni alloy at a large deposition angle on the supply side and at a small deposition angle on the take up side, rewinding the semi-finished product thus obtained, repeating the foregoing process steps, forming a diamond-like carbon protective film, and further forming a lubricant layer over the diamond-like carbon protective film, all within a vacuum chamber.

2 Claims, 2 Drawing Sheets

MAGNETIC RECORDING MEDIUM

BACKGROUND OF THE INVENTION

This invention relates to a magnetic recording medium having a magnetic recording layer of ferromagnetic metal film, and more particularly to an improved magnetic recording medium of the character having high output and high C/N characteristics and, moreover, increased durability.

Technology of magnetic recording media using a Co-Ni, Co-Cr, or other ferromagnetic metal film as the magnetic recording layer has been widely studied and carried into practice. It is aimed primarily at higher density recording in video, digital, and other recording techniques and at the introduction of smaller, higher-performance recording-reproducing devices than heretofore.

To enhance the magnetic characteristics of those media for services over broader bandwidths than heretofore, attempts are being made to provide magnetic layers of multiple structures. For example, Japanese Patent Application Publication No. 21966/1991 discloses a magnetic recording medium having a magnetic layer fabricated from multiple layers of a ferromagnetic metal by vacuum vapor deposition, ion plating, sputtering, or other technique. The multilayer construction has dual purposes of reducing noise and allowing an under-layer ferromagnetic metal film to secure an output on the low frequency side with a low coercive force and an upper-layer ferromagnetic metal film to secure an output on the high frequency side with a high coercive force.

There is shown in FIG. 1 an exemplary magnetic recording medium of the prior art having multiple layers of a ferromagnetic metal film. Over the surface of a nonmagnetic base, e.g., of polyester are formed two or more magnetic layers, e.g., under-layer ferromagnetic metal films 4, 4' and an upper-layer ferromagnetic metal film 6. Generally, the vapor deposition angles of the individual ferromagnetic metal films (the deposition angles as measured from lines normal to the film surface on the nonmagnetic base, the same applying hereinafter) are made larger in the lower layers and smaller in the upper layers. It is also common that the deposition angle of at least one of the under-layer ferromagnetic metal films 4, 4', e.g., the metal film 4', is made reverse to the deposition angle of the upper-layer ferromagnetic metal protective film 6, so that, as viewed from the magnetic head, a generally low coercive force is maintained to secure a low-frequency output whereas the upper-layer ferromagnetic metal film 6, as viewed from the magnetic head, generally maintains a high coercive force to secure a high-frequency output.

Ferromagnetic metal films usually are worn rather easily by friction with magnetic heads and other sliding members. It has therefore been proposed to apply a lubricant or form a lubricant layer on the ferromagnetic metal film surface to reduce the friction, or to provide a sufficiently hard protective film to increase the wear resistance. For example, Japanese Patent Application Public Disclosure Nos. 132623/1990 and 224132/1991 suggest improvements in the durability and running stability of ferromagnetic metal films by the formation thereon of a diamond-like carbon protective film and by the further formation of a lubricant layer. The diamond-like carbon protective film, which is only slightly permeable to moisture, has an anticorrosive effect and thereby helps maintain the magnetic recording characteristics.

Nevertheless, the recent tendency is toward higher density digital recording on magnetic recording media, and those media of multilayer structures described above are unable to meet the ever growing high output requirements.

It is therefore an object of the present invention to provide a magnetic recording medium capable of higher density recording than before.

The magnetic recording medium of the type comprising a nonmagnetic base of polyethylene terephthalate or other plastic, a ferromagnetic metal layer formed thereon, and a diamond-like carbon protective film further formed thereon has a problem of magnetic characteristic deterioration. This is because the nonmagnetic layer permits the permeation of moisture to some extent and is thereby corrosively attacked from the underside upwardly with extended use. The problem is particularly serious on the high frequency side. Another problem is curling that results from the formation of the ferromagnetic metal film on a plastic surface by vapor deposition, sputtering or the like, with the metal film embraced by the substrate. Formation of the diamond-like carbon protective film on the metal film curls reversely, thus tending to offset the curl with the ferromagnetic metal film. However, unless the two films are properly combined, the curl compensation is inadequate and makes the contact of the medium with a magnetic head incomplete, failing to keep the magnetic recording characteristics constant.

Therefore, it is another object of the invention to provide a magnetic recording medium of a high-output, high-C/N ferromagnetic metal type having a satisfactory anticorrosive effect and a limited curling tendency.

SUMMARY OF THE INVENTION

This invention provides a magnetic recording medium comprising a nonmagnetic base, an $SiO_x$ ($x=1.2-1.95$) undercoat, an under-layer ferromagnetic metal film consisting of a Co-Ni alloy, an $SiO_x$ ($x=1.2-1.95$) intermediate layer, an upper-layer ferromagnetic metal protective film consisting of a Co-Ni alloy, a diamond-like carbon protective film, and a lubricant layer, formed in the order of mention, the angles of vapor deposition as measured from lines normal to the upper- and under-layer ferromagnetic metal films being all decreasing toward the upper surfaces.

In the magnetic recording medium, the deposition angles of the individual magnetic metal films range from 40 to 90 deg., preferably from 40 to 80 deg., the degree on the surface side being in the vicinity of 40 deg. This permits particularly high frequency and high density recording.

The magnetic characteristics are notably improved when the upper-layer ferromagnetic metal film consists of 85 to 95% by weight of Co and the balance Ni and the under-layer ferromagnetic metal film consists of 70 to 85% by weight of Co and the balance Ni.

The above magnetic recording medium can be manufactured by a method which comprises forming an $SiO_x$ ($x=1.2-1.95$) undercoat by vapor deposition on a flexible nonmagnetic base being fed, forming an under-layer ferromagnetic metal film by vapor deposition of a Co-Ni alloy at a large deposition angle on the supply side and at a small deposition angle on the take up side, rewinding the semi-finished product thus obtained, repeating the foregoing process steps, forming a diamond-like carbon protective film, and further forming a lubricant layer over the diamond-like carbon protective film, all within a vacuum chamber.

DETAILED DESCRIPTION OF THE INVENTION

Figure 1:
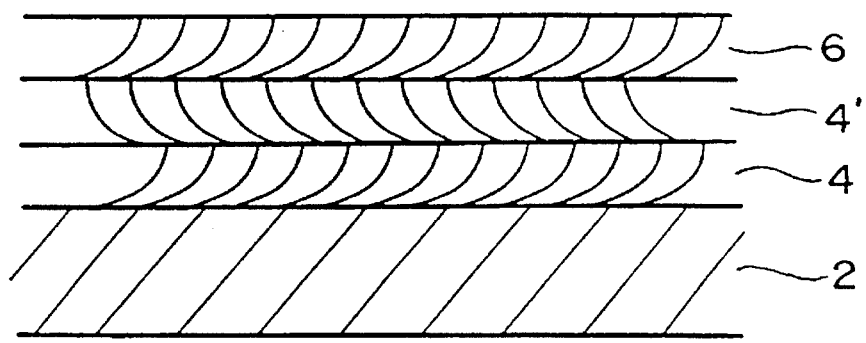
FIG. 1 is a sectional view illustrating the construction of a conventional recording medium having multiple layers of a ferromagnetic metal film.

The invention will be more concretely described below. In a vacuum chamber a first and a second rotating drums are installed. While a flexible nonmagnetic base is being fed along the first rotating drum and then along the second rotating drum, an $SiO_x$ undercoat is formed thereon by vapor deposition of molten $SiO_x$ (x is as defined above) from a crucible located opposite to the first rotating drum. Next, an under-layer ferromagnetic metal film is formed on the nonmagnetic base by vapor deposition of a molten Co-Ni alloy from a crucible located opposite to the second rotating drum, at a large alloy deposition angle on the supply side and at a small angle on the take up side. The semifinished product so obtained is wound back and subjected to similar steps to form an $SiO_x$ intermediate layer and an upper-layer ferromagnetic metal film. Further, a diamond-like carbon protective film is formed over the upper-layer ferromagnetic metal film by a diamond-like carbon protective film former disposed opposite to the second rotating drum. Finally a lubricant layer is formed over the diamond-like carbon protective film to conclude the manufacture. The method permits the formation of two ferromagnetic layers, two $SiO_x$ films, and a diamond-like carbon protective film, all within a single chamber. This prevents the dropouts under the influence of impurities. Also, the simple, continuous operation facilitates the manufacture.

The magnetic recording medium of the invention is protected against rust owing to its undercoat and upper-layer protective film. Moreover, with the under-layer ferromagnetic metal film consisting of 70–85 wt % Co and the balance Ni and the upper-layer ferromagnetic metal film consisting of 80–95 wt % Co and the balance Ni, the magnetic recording medium attains high output and high C/N ratio.

Under the invention two ferromagnetic metal layers, upper and under, are formed, with the angles of vapor deposition large in the lower portion and small in the upper portion of the individual layers, in the range of 40–90 deg., preferably 40–80 deg. Consequently, the resulting recording medium is suited for digital recording with emphasis on the high frequency side and improved output and S/N on that side. When the upper and under layers are formed from dissimilar compositions, the output and S/N on the high frequency side are even more improved.

Also, according to the invention, the two ferromagnetic metal layers are separated and covered by the $SiO_x$ undercoat, intermediate layer, and diamond-like carbon protective film. Since the undercoat, intermediate layer, and protective film serve as barriers against moisture, the upper and under ferromagnetic metal layers are completely protected against rusting and enable the recording medium to maintain its high frequency characteristics for long. The interposition of the nonmagnetic intermediate layer between the upper and under magnetic layers lessens the magnetic interaction of the two magnetic layers and allows the layers to exhibit the magnetic characteristics of the particles independently of each other, with the result that electrical characteristics too are improved.

Further, the lamination of the diamond-like carbon protective film to the ferromagnetic metal layers ensures perfect prevention of curling. Thus a magnetic recording medium is provided which has high flatness and therefore excellent magnetic recording characteristics.

The lubricant layer assures good running performance.

Preferably, the under-layer ferromagnetic metal film is a film consisting of 70–85 wt % Co and 30–15 wt % Ni and formed by vapor deposition. An alloy of such a composition is used for the under-layer ferromagnetic metal film because its balanced between characteristics and reliability. If Co accounts for less than 70% the coercive force is too low for magnetic characteristics, leading to insufficient output. A Co percentage in excess of 85% affects the reliability, particularly durability, unfavorably.

Preferably, for the upper-layer ferromagnetic metal film a vapor deposition film comprising 85–95 wt % Co and 15–5 wt % Ni is used. If the Co percentage is less than 80% an insufficient output over a broad bandwidth results, but if it exceeds, the durability is low.

Figure 2:
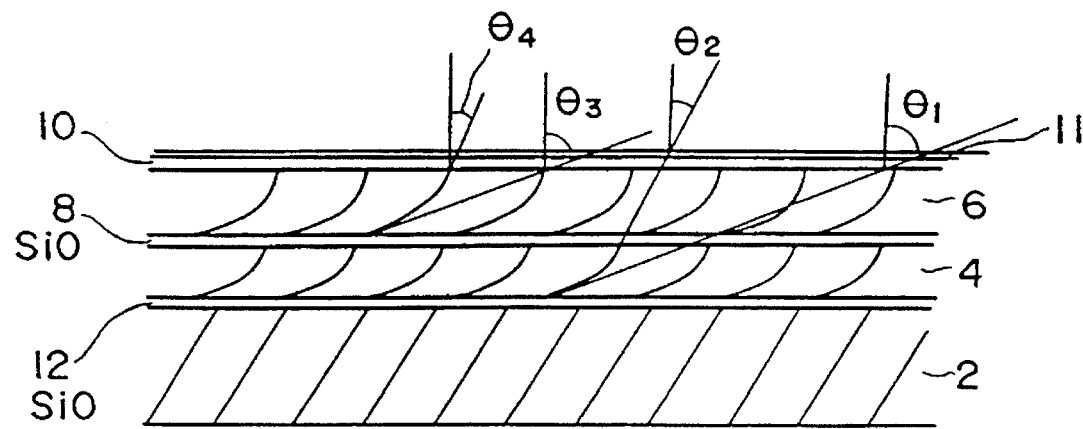
FIG. 2 is a sectional view illustrating the construction of a recording medium having a double-layer ferromagnetic metal film according to this invention.

Next, as shown in FIG. 2, both the under- and upper-layer ferromagnetic metal films have a tendency that the angles of vapor deposition increase downwardly and decrease upwardly. To be more specific, the magnetic recording medium of the invention includes an $SiO_x$ undercoat 12, an under-layer ferromagnetic metal film 4, an $SiO_x$ intermediate layer 8, an upper-layer ferromagnetic metal film 6, a diamond-like carbon protective film 10, and a lubricant layer 11 formed, in the ascending order, on a nonmagnetic base 2 of polyester or the like. The deposition angle of the under-layer ferromagnetic metal film 4 is made large ($\theta_1$) in the lower portion and small ($\theta_2$) in the upper portion. Similarly, the deposition angle of the upper-layer ferromagnetic metal film 6 too is made large ($\theta_3$) and small ($\theta_4$) in the upper portion. In either layer the deposition angle is within the range of 40 to 90 deg, and the angle on the outer surface side is made as close to 40 deg. as possible so as to achieve improved high frequency characteristics. The smaller the surface deposition angle the higher the density of recording that becomes possible. Because it influences the adhesion, the deposition angle on the underside desirably is 80 deg. or smaller.

Figure 3:
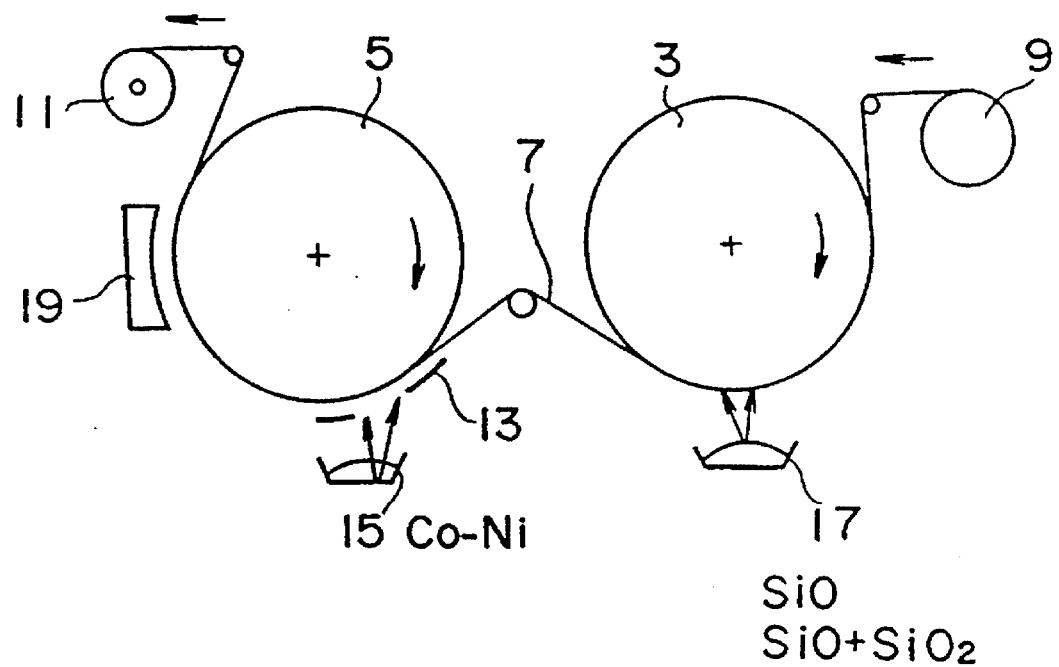
FIG. 3 is a schematic view of an apparatus for practicing the invention.

The $SiO_x$ film is formed in the following way. A crucible 17 as shown in FIG. 3 is filled with either SiO or a 1:1 mixture of SiO and $SiO_2$ and heated for vapor deposition. In the case of SiO the deposition is carried out with simultaneous introduction of oxygen. The crucible 17 desirably is located immediately below a rotating drum 3. The drum may be equipped with a shutter to keep the SiOx vapor from depositing on unnecessary areas. In that case the shutter is desired to have an aperture of approximately ±40 deg. The vapor deposition is effected using a sheathed heater or electron-beam evaporator, the latter being preferred.

The nonmagnetic base may be any of known plastic or engineering plastic supports, including polyamides and polyesters such as polyethylene terephthalate, polyimides, aramids, PEEK, and polysulfones.

The method of forming a ferromagnetic metal film on a nonmagnetic surface is, e.g., by electron-beam evaporation, ion plating, or sputtering. Electron-beam evaporation was chosen for the examples below. To be more exact, a Co-Ni alloy held in a crucible was melted by irradiation with electron beams in a vacuum, and the resulting vapor was deposited onto a length of polyethylene terephthalate film travelling at a constant speed along the surface of a rotating drum.

The diamond-like protective film according to the present invention may be produced by any of conventional methods through proper control of the manufacturing conditions. For example, as taught by Patent Application Public Disclosure No. 132623/1990, such a film may be formed by sputtering through glow discharge of Ar and $H_2$ using graphite as a target. Other prior art techniques include plasma polymerization of a low-molecular-weight hydrocarbon, e.g., methane, ethane, or butane, and ionization evaporation whereby such a gas is ionized by glow discharge and then formed onto an objective film.

The diamond-like protective film desirably has a composition consisting of 60 to 70 at % carbon and 30 to 40 at % hydrogen. When C/H is 0.5, as in polyethylene, the constituent carbon atoms are arranged in straight chains with no cross-linking. Deviation from that compositional range (C/H=0.5) produces a cross-linked structure, resulting in a sharp increase in the film strength. At C/H=0.5 the film is clear, but at C=60–70 at % and H=30–40 at %, it becomes black. This is because the H percentage in the C—H structure is smaller and the C—C bonds larger with simultaneous formation of C=C bonds. It represents the progress of cross-linking. Consequent enhancement of strength makes the film as hard as ceramics.

It should be noted that the diamond-like carbon protective film is utterly dissimilar to the diamond film formed by the vapor phase process. The former forms a continuous phase of an amorphous or nearly amorphous structure, whereas the diamond film is an aggregate of fine crystals not in a continuous-phase state. The two show distinctly distinguishable spectral positions in Raman spectroscopic analysis. The diamond-like carbon protective film have broad spectral peaks at 1560 cm$^{-1}$ and 1330 cm$^{-1}$, while the diamond film shows a sharp peak at 1333 cm$^{-1}$.

The lubricant layer is formed from a fatty acid, perfluoroalkylcarboxylic acid, perfluoroalkyl polyether, higher alcohol, fatty acid amide, or other similar lubricant, preferably of a fluorinated one.

The present invention will be more fully described below in connection with examples thereof.

For the examples the vapor deposition apparatus illustrated in FIG. 3 was used.

FIG. 3 shows the apparatus 1. It is taken for granted that the components shown are housed in a vacuum chamber not shown and the apparatus is equipped with necessary evacuating means. Indicated at 3 and 5 are rotating drums both running in the directions of the arrows. A length of nonmagnetic base film 7 of polyester or the like that forms a base for vapor deposition is extended partly around the rotating drums 3, 5. It is unrolled from a supply roll 9, passed along the drums while being subjected to vapor deposition of certain SiO$_x$ and Co-Ni alloy, and is wound on a take-up roll 11. The base film is then unwound backwardly for another treatment similar to the above but modified in conditions, and lastly a diamond-like carbon protective film is formed at the outlet of the rotating drum 5.

A crucible 17 holding molten silicon oxide is located close to the rotating drum 3, so that an undercoat 12 and an intermediate layer 8 can be formed on the nonmagnetic base 7.

There is a partly open mask 13 held in the close vicinity of the rotating drum 5 to keep off the vapor deposition on the film 7 unless at given angles. A shutter (not shown) is fitted along the outer (or inner) surface of the mask 13. At the early and final stages of deposition the shutter slides in the directions of the arrows to shield the opening of the mask 13 so as to prevent unwanted deposition. The dimensions of the opening of the mask 13 are chosen so that, in the axial direction of the rotating drum 5, a desired deposition width on the film 5 is obtained and, in the circumferential direction of the drum, a desired deposition angle range θ (initially large and gradually become smaller as the film is fed) is obtained.

Opposite to the opening of the mask 13 is disposed a crucible 15 of high purity magnesia (MgO) or the like, charged with a material metal consisting of a Co-Ni alloy to be evaporated for deposition. The crucible 15 is elongated a sufficient distance axially of the rotating drum 5 to obtain a necessary width of deposition. The material metal charged in the crucible 15 is heated by electron beams emitted from electron guns (not shown).

It will be appreciated from the drawing that the deposition angle decreases as the evaporation progresses. After the under layer has been formed by deposition, the film is wound back and again subjected to vapor deposition to form an upper layer.

The film on which the upper-layer ferromagnetic metal protective film has been deposited is then formed with a diamond-like carbon protective film on the rotating drum 5. This is done, e.g., by applying a high frequency current to an electrode of a film former 19 and producing a plasma of hydrocarbon with AC power, and depositing the resulting vapor on the base. The high frequency desirably ranges from 50 to 450 kHz, preferably from 100 to 400 kHz. The material to be used is a lower hydrocarbon gas (e.g., methane, ethane, propane, butane, ethylene, or acetylene) or a gaseous mixture of such a hydrocarbon and hydrogen. Typically, methane gas is vapor deposited at an AF frequency of about 100 kHz with an electric power of about 100 W to form a film about 100 Å thick.

The formation of the diamond-like carbon protective film on the upper-layer ferromagnetic layer may be preceded by plasma treatment as a pretreatment by the same apparatus. The desirable gas for the treatment is Ar or $O_2$.

Plasma treatment with hydrogen is performed in the following manner. A nonmagnetic base having ferromagnetic metal films, placed in an evacuated vacuum chamber, is treated under the conditions: degree of vacuum=0.01–1 Torr; hydrogen flow rate=5–100 SCCM; frequency=0–13.5 MHz-Hz; electric power=10–100 W; power density=0.1–0.5 W/cm$^2$. The plasma treatment cleans and activates the ferromagnetic metal film surface.

Additional coating with a lubricant layer completes a magnetic recording medium.

Thus the polyethylene terephthalate nonmagnetic base, SiO$_x$ undercoat, Co-Ni under-layer ferromagnetic metal film, SiO$_x$ intermediate layer, Co-Ni upper-layer ferromagnetic metal protective film, and diamond-like carbon protective film are formed in the order of mention. The deposition angles as measured from lines normal to the upper- and under-layer ferromagnetic metal film surfaces are made smaller upwardly toward the surfaces. The final coating with the lubricant layer gives the magnetic recording medium.

The method so far described simplifies the process by forming all the component layers, excepting the lubricant layer, by one and the same apparatus.

EXAMPLE 1

An SiO$_x$ (x=1.5) undercoat was formed to a thickness of 100 Å and then a Co-Ni (80:20) alloy film to a thickness of 0.1 μm on a polyethylene terephthalate film surface. The deposition angle at the lowermost portion of the Co-Ni film was 80 deg. and that at the uppermost portion was 40 deg.

After rewinding, the coated base film was further formed with a 100 Å-thick $SiO_x$ intermediate layer and a 0.1 μm-thick Co-Ni (90:10) alloy film.

Finally, a diamond-like carbon protective film of 100 Å thickness was formed under the following conditions:

| Material | $CH_4:H_2$ = 4:1 |
|---|---|
| Pressure | 0.05 Torr |
| AF frequency | 100 kHz |
| Electric power | 90 W |

The film was taken out of the vacuum chamber and was coated with perfluoroalkyl polyether to a thickness of 30 Å as a lubricant layer, thus completing a magnetic tape.

media having the $SiO_x$ undercoats and intermediate layers and diamond-like carbon protective films (abbreviated to DLC layers) as shown in Table 1 were fabricated.

Curling of the products obtained in the above examples and comparative examples was determined by slitting test tapes into ribbons 8 mm wide, allowing them to stand on a horizontal surface, and then measuring their heights. An indication of corrosion resistance, ΔB (%), was obtained by measuring the decrease in the residual flux density, Br, of each test tape after standing at 60° C. and 90%RH for one week. The smaller the value the better. The output and C/N were compared with those of a commercially available product ("P6-120." manufactured by TDK Corp.). Still characteristic represents the reproduction time (min.) that the reproduction output takes for a 2 dB drop. Hardness is that of Vickers of the diamond-like carbon protective film prior to the coating with a lubricant. The output and C/N values were measured after storage at 60° C. and 90%RH for 3 days. The results are summarized in Table 1.

TABLE 1

|  | Undercoat X | Interlayer X | DLC layer C content | Curl (mm) | ΔB (%) | Output (dB) | C/N (dB) | Fric. coef. (μ) | Still time (min) | Hardness |
|---|---|---|---|---|---|---|---|---|---|---|
| Example 1 | 1.5 | 1.5 | 70 | 0 | 5 | +3.8 | +3.2 | 0.22 | 120 | 1800 |
| Example 2 | 1.5 | 1.5 | 65 | 0 | 7 | +3.8 | +3.2 | 0.25 | 100 | 1000 |
| Comp. Ex. 1 | — | — | 70 | 0.5 | 20 | — | — | 0.22 | 10 | 1800 |
| Comp. Ex. 2 | 1.1 | 1.5 | 70 | 0.3 | 15 | +2.5 | +1.5 | 0.22 | 20 | 1800 |
| Example 3 | 1.2 | 1.5 | 70 | 0 | 7 | +3.8 | +3.2 | 0.22 | 120 | 1800 |
| Example 4 | 1.8 | 1.5 | 70 | 0 | 5 | +3.8 | +3.2 | 0.22 | 120 | 1800 |
| Example 5 | 1.9 | 1.5 | 70 | 0 | 3 | +3.8 | +3.2 | 0.22 | 120 | 1800 |
| Example 6 | 1.95 | 1.5 | 70 | 0 | 3 | +3.8 | +3.2 | 0.22 | 120 | 1800 |
| Comp. Ex. 3 | 2.0 | 1.5 | 70 | 0.5 | 15 | +2.5 | +1.5 | 0.22 | 20 | 1800 |
| Comp. Ex. 4 | 1.5 | 1.1 | 70 | 0.3 | 15 | +2.5 | +1.5 | 0.22 | 20 | 1800 |
| Example 7 | 1.5 | 1.2 | 70 | 0 | 7 | +3.8 | +3.2 | 0.22 | 120 | 1800 |
| Example 8 | 1.5 | 1.8 | 70 | 0 | 5 | +3.8 | +3.2 | 0.22 | 120 | 1800 |
| Example 9 | 1.5 | 1.9 | 70 | 0 | 3 | +3.8 | +3.2 | 0.22 | 120 | 1800 |
| Example 10 | 1.5 | 1.95 | 70 | 0 | 3 | +3.8 | +3.2 | 0.22 | 120 | 1800 |
| Comp. Ex. 5 | 1.5 | 2.0 | 70 | 0.5 | 15 | +2.5 | +1.5 | 0.22 | 20 | 1800 |
| Comp. Ex. 6 | 1.5 | 1.5 | 55 | 0.2 | 10 | +3.0 | +3.0 | 0.35 | 5 | 300 |
| Example 11 | 1.5 | 1.5 | 60 | 0 | 5 | +3.8 | +3.8 | 0.22 | 120 | 1000 |
| Comp. Ex. 7 | 1.5 | 1.5 | 75 | 0 | 3 | — | — | 0.38 | 10 | 2500 |
| Comp. Ex. 8 | — | — | — | 0.7 | 25 | 0 | 0 | 0.30 | 20 | — |

EXAMPLE 2

In Example 1, the conditions for forming the diamond-like carbon protective film were partly changed as follows.

| Material | $CH_4:H_2$ = 2:1 |
|---|---|
| Pressure | 0.05 Torr |
| AF frequency | 100 kHz |
| Electric power | 90 W |

COMPARATIVE EXAMPLE 1

The procedure of Example 1 was followed with the exception that neither the $SiO_x$ undercoat nor the intermediate layer was formed.

EXAMPLES 3–11 & COMPARATIVE EXAMPLES 2–7

The procedure of Example 1 was repeated with partial modifications of the conditions, and magnetic recording The table reveals the following:

(1) Curl:— The $SiO_x$ undercoat and intermediate layer reduce curling. A particularly effective x range is x=1.2–1.95. The diamond-like carbon protective film with a carbon content of less than 60 at % causes much curling.

(2) Corrosion resistance:— If the x value of the undercoat and intermediate layer is too large or too small, the ΔB is large and the corrosion resistance low. A desirable range is x=1.2–1.95. If the carbon content of the diamond-like carbon protective film is less than 60 at %, the corrosion resistance becomes inadequate. The greater the curl the smaller the C/N output.

(3) Friction coefficient:— The friction increases when the diamond-like carbon protective film has an insufficient or excessive carbon content. A desirable range of carbon content is C=60–70 at %.

(4) Still time:— The still time is short when the curl is large. It is again short when the diamond-like carbon protective film contains too much carbon. Hence the desirable carbon content C=60–70 at %.

(5) Hardness:— If the hardness is too low or too high, the friction is much and the still time short. This is because too low hardness injures the tape while too high hardness damages the head.

As will be understood from the foregoing, the magnetic recording medium according to the present invention is protected against curling and rusting by the $SiO_x$ undercoat and intermediate layer as well as by the protective layer. Since the ferromagnetic metal films constituting the under and upper layers, made of a Co-Ni alloy, have the same directions of vapor deposition, a magnetic recording medium having a high output and high C/N ratio can be obtained. The method of the invention permits the formation of two ferromagnetic layers and two $SiO_x$ films within a single chamber. This prevents the dropouts under the influence of impurities. Also, the simplicity and continuity of operation facilitates the manufacture.

What is claimed is:

1. A magnetic recording medium comprising a nonmagnetic base, an $SiO_x$ (x=1.2–1.85) undercoat, an under-layer ferromagnetic metal film consisting of a Co-Ni alloy, an $SiO_x$ (x=1.2–1.8) intermediate layer, an upper-layer ferromagnetic metal film consisting of a Co-Ni alloy, a diamond-like carbon protective film having a carbon content of 60–70 at %, and a lubricant layer, formed in the order of mention, the angles of vapor deposition as measured from lines normal to surfaces of the upper- and under-layer ferromagnetic metal films being all decreasing toward the upper surfaces within the range from 40 to 80 degrees and the upper-layer ferromagnetic metal film consisting of 85 to 95 percent by weight of Co and the balance Ni and the under-layer ferromagnetic metal consists of 70 to 85 percent by weight of Co and the balance Ni.

2. The magnetic recording medium of claim 1 wherein the diamond-like carbon protective film has a composition consisting of 60 to 70 atomic percent of carbon and 30 to 40 atomic percent of hydrogen.

\* \* \* \* \*